L. ALFANO.
TAILOR'S MEASURE.
APPLICATION FILED JUNE 2, 1913.
1,081,649.
Patented Dec. 16, 1913.
2 SHEETS—SHEET 1.
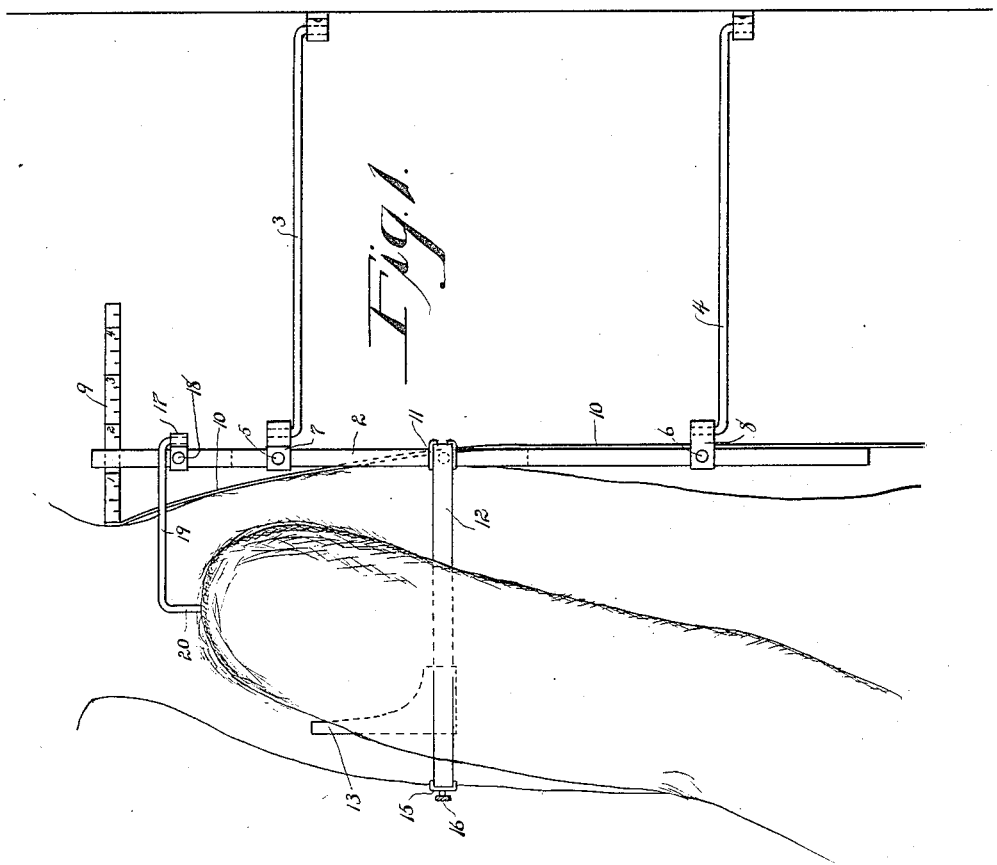

L. ALFANO.
TAILOR'S MEASURE.
APPLICATION FILED JUNE 2, 1913.
1,081,649.
Patented Dec. 16, 1913.
2 SHEETS—SHEET 2.
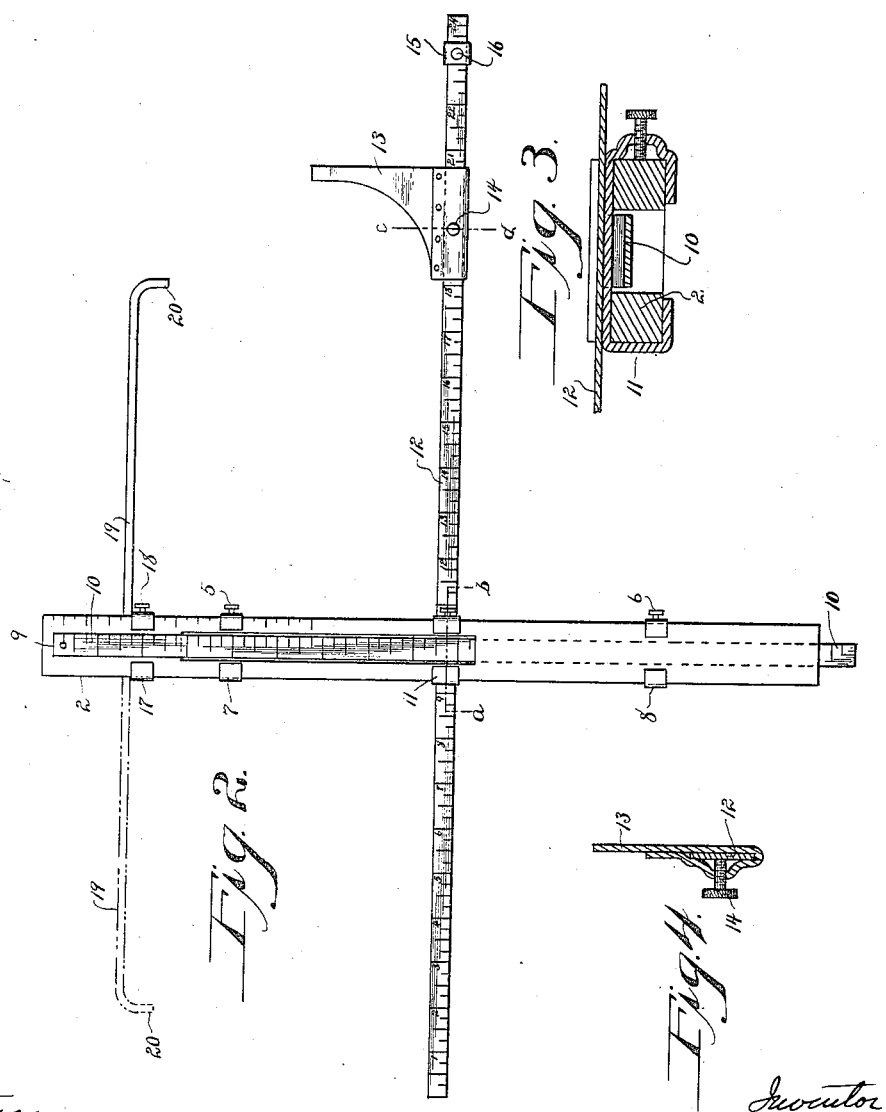

UNITED STATES PATENT OFFICE.

LOUIS ALFANO, OF SOUTHINGTON, CONNECTICUT.

TAILOR'S MEASURE.

1,081,649.   Specification of Letters Patent.   Patented Dec. 16, 1913.

Application filed June 2, 1913. Serial No. 771,207.

*To all whom it may concern:*

Be it known that I, LOUIS ALFANO, a subject of the King of Italy, residing at Southington, in the county of Hartford and State of Connecticut, have invented a new and useful Improvement in Tailors' Measures; and I do hereby declare the following, when taken in connection with the accompanying drawings and the characters of reference marked thereon, to be a full, clear, and exact description of the same, and which said drawings constitute part of this application, and represent, in—

Figure 1 a side view of a tailor's measure constructed in accordance with my invention shown in connection with a portion of the human figure. Fig. 2 a front view of the measure. Fig. 3 a sectional view on the line $a$—$b$ of Fig. 2. Fig. 4 a sectional view on the line $c$—$d$ of Fig. 2.

This invention relates to an improvement in tailors' measures such as are employed in measuring the body for the purpose of obtaining the necessary lines on which to cut a coat or vest pattern, the object being to provide a simple device whereby the necessary measurements and curves may be readily obtained, and the invention consists in the construction hereinafter described and particularly recited in the claims.

In carrying out my invention, I employ a vertically arranged rod 2 adapted to be supported by arms 3, 4, from a wall or other suitable support, this rod being made vertically adjustable by means of set screws 5, 6, in the guides 7 and 8, by which the rod is supported. Extending transversely through the top of the rod and movable transversely to the rod is a gage 9 adapted to be moved forward to strike the neck of the person being measured and so as to indicate the curve of the back. In other words, this indicates whether the person's figure is stooping or erect. Attached to the outer end of this gage 9 is a tape 10 adapted to measure the distance from the neck to the waist line. Vertically movable on the rod 2 is a slide 11 to which is attached a tape 12 preferably of steel by which the bust measure may be taken; and sliding on this steel tape is an arm 13 giving the scye. This arm is adapted to be clamped in place by a set screw 14, and on one end of the tape 12 is a stop 15 adapted to be fixed to the tape by a set screw 16. Also mounted on the rod 2 above the supporting arm 3 is a socket 17 adapted to be fixed by a screw 18, and in this socket is a shoulder gage 19 having a downwardly projecting end 20 which may be turned from one side to the other so as to indicate the differences in the height of the shoulders.

With the device thus described all the measurements necessary for plotting a pattern for a coat and vest may be readily obtained, and variations in the figure conveniently indicated.

I claim:—

1. A tailor's measure comprising a vertically adjustable rod formed at its upper end with a transverse opening, a horizontally movable gage extending through said opening, a chest tape connected with said rod, a scye arm sliding on said chest tape, and a shoulder gage pivotally mounted on said rod and adapted to swing from one side to the other.

2. A tailor's measure comprising a rod, arms by which the rod is held in a vertical position, said rod formed at its upper end with a neck gage movable at right angles to said rod, a tape connected at the outer end of said gage, a chest tape slidably connected with said rod, a scye arm slidably mounted on said chest tape, a shoulder gage adjustably connected with said rod and adapted to be swung from one side to the other.

In testimony whereof, I have signed this specification in the presence of two subscribing witnesses.

LOUIS ALFANO.

Witnesses:
VINCENZO DI FABIO,
FRANK TOMASSETTI.